(12) United States Patent
Halvorson et al.

(10) Patent No.: US 9,657,859 B2
(45) Date of Patent: May 23, 2017

(54) COMBINATION AIR VALVE

(71) Applicant: DeZURIK, Inc., Sartell, MN (US)

(72) Inventors: Forrest Halvorson, Becker, MN (US); Larry Larson, Rogers, MN (US); Vincent M. Sabalvaro, III, Bethel, MN (US); Duane Plumski, St. Joseph, MN (US); Adam L. Kalthoff, Albany, MN (US)

(73) Assignee: DeZURIK, Inc., Sartell, MN (US)

( * ) Notice: Subject to any disclaimer, the term of this patent is extended or adjusted under 35 U.S.C. 154(b) by 0 days.

(21) Appl. No.: 14/435,087

(22) PCT Filed: Oct. 1, 2013

(86) PCT No.: PCT/US2013/062921
§ 371 (c)(1),
(2) Date: Apr. 10, 2015

(87) PCT Pub. No.: WO2014/055557
PCT Pub. Date: Apr. 10, 2014

(65) Prior Publication Data
US 2015/0267828 A1 Sep. 24, 2015

Related U.S. Application Data

(60) Provisional application No. 61/708,118, filed on Oct. 1, 2012.

(51) Int. Cl.
*F16K 24/04* (2006.01)
*F16K 31/20* (2006.01)
(Continued)

(52) U.S. Cl.
CPC .......... *F16K 24/044* (2013.01); *F16K 24/042* (2013.01); *F16K 31/18* (2013.01);
(Continued)

(58) Field of Classification Search
CPC ...... F16K 24/042; F16K 24/044; F16K 31/18; F16K 31/20; F16K 31/22; F16K 31/24;
(Continued)

(56) References Cited

U.S. PATENT DOCUMENTS 1,119,979 A 12/1914 Mulligan
1,629,789 A 5/1927 Harrison
(Continued)

FOREIGN PATENT DOCUMENTS

WO 2014055557 4/2014

OTHER PUBLICATIONS

International Preliminary Report on Patentability for PCT/US2013/062921 mailed Apr. 16, 2015 (6 pages).
(Continued)

*Primary Examiner* — William McCalister
*Assistant Examiner* — Ian Paquette
(74) *Attorney, Agent, or Firm* — Pauly, Devries Smith & Deffner, LLC

(57) ABSTRACT

The present disclosure is directed to a combination air valve that uses buoyancy to lift seals into place, preventing media from escaping from the valve. Once the seals are in place, pipeline pressure is used to open and close the valve. The combination air valve includes a piston assembly which includes a main disc, a piston head located above the main disc, a float below the main disc, and a float shaft joining the float to the piston. When no media is in the valve the float is at the bottom of the valve and the main disc is down, allowing gases to leave the valve. The float is lifted as media enters the valve, thus using buoyancy to lift the main disc into place, preventing media from escaping from the valve. Once the seals are in place, pipeline pressure is used to open and close the valve.

21 Claims, 20 Drawing Sheets

(51) Int. Cl.
  *F16K 33/00* (2006.01)
  *F16K 31/18* (2006.01)
(52) U.S. Cl.
  CPC .............. *F16K 31/20* (2013.01); *F16K 33/00* (2013.01); *Y10T 137/3099* (2015.04)
(58) Field of Classification Search
  CPC .... F16K 31/363; F16K 31/365; F16K 31/383; F16K 31/3835; Y10T 137/3099
  USPC ........................................................ 137/202
  See application file for complete search history.

(56) References Cited

U.S. PATENT DOCUMENTS

| | | | | |
|---|---|---|---|---|
| 2,179,750 | A | * | 11/1939 | McCracken ............ F16K 17/19 |
| | | | | 137/202 |
| 4,586,528 | A | | 5/1986 | Andres et al. |
| 4,696,321 | A | * | 9/1987 | Reese ................... F16K 24/042 |
| | | | | 137/202 |
| 7,617,838 | B2 | | 11/2009 | Katzman et al. |
| 2005/0268965 | A1 | * | 12/2005 | Muller .................. F16K 24/042 |
| | | | | 137/202 |
| 2006/0086388 | A1 | | 4/2006 | Fye |
| 2009/0139581 | A1 | * | 6/2009 | Herlihy ................ F16K 24/044 |
| | | | | 137/202 |

OTHER PUBLICATIONS

International Search Report and Written Opinion for PCT/US2013/062921, mailed Dec. 26, 2013 (9 pages).

* cited by examiner

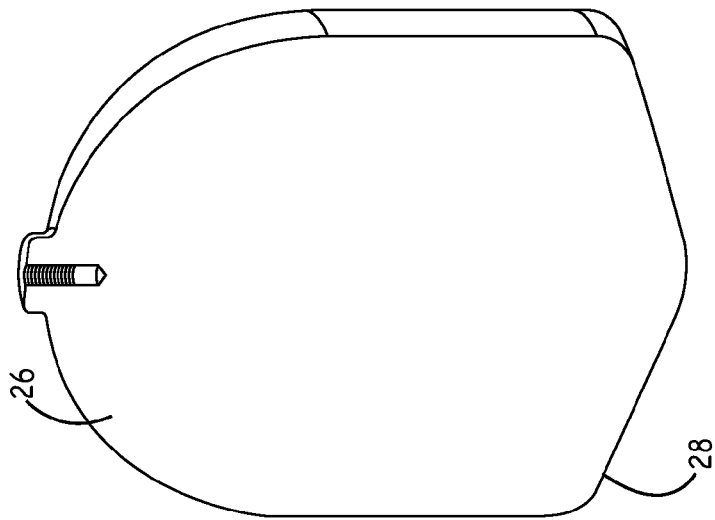
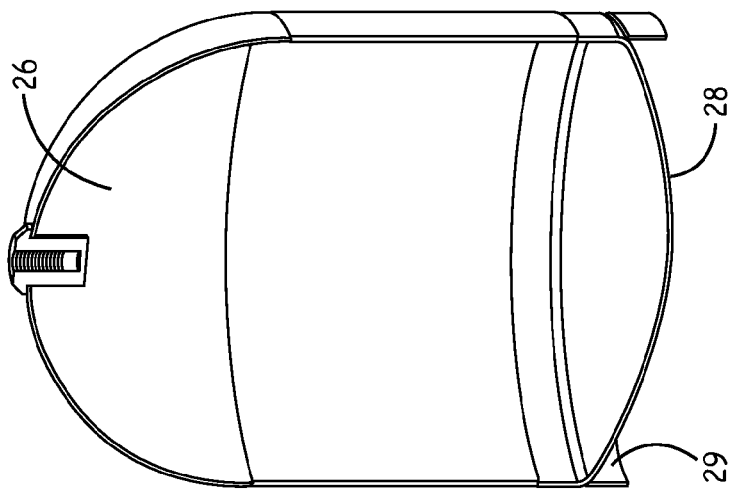
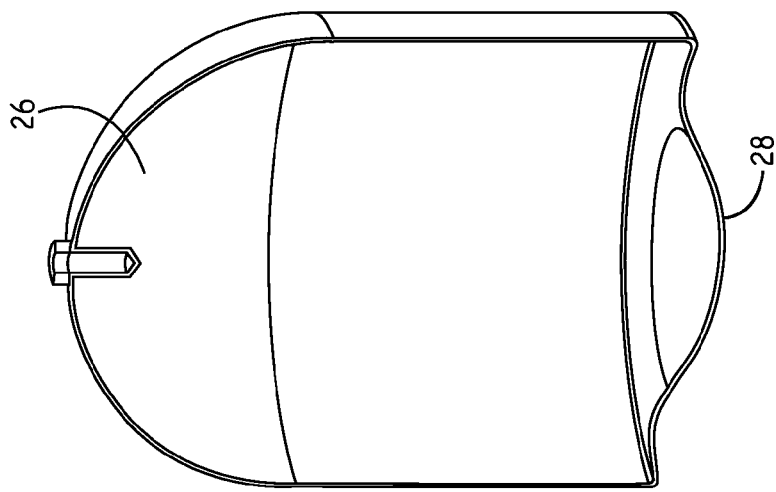

COMBINATION AIR VALVE

This application is being filed as a PCT International Patent application on Oct. 1, 2013 in the name of DeZURIK, INC., a U.S. national corporation, applicant for the designation of all countries and Forrest Halvorson, a U.S. Citizen, and Larry Larson, a U.S. Citizen, inventors for the designation of all countries, and claims priority to U.S. Provisional Patent Application No. 61/708,118, filed Oct. 1, 2012, the contents of which is herein incorporated by reference in its entirety.

FIELD OF THE INVENTION

The present invention is directed to valves, in particular to air release valves for use in pipelines and similar media handling systems.

BACKGROUND OF THE INVENTION

Pipelines, and similar media handling and conveying systems, often accumulate air. The air can accumulate from bubbles within the media being conveyed (as used herein, media refers to a liquid that may contain solid or semi-solid material), by gasses that vent from the media, or during filling and emptying cycles of the pipeline.

It is often desirable to remove the accumulated air from the pipelines, and air valves have been developed for this purpose. Traditional air valves use the buoyancy of a float to close the valve. However, such designs suffer from a number of shortcomings, including the problem that each air release valve must be customized for different uses, because of the varying pressures, flow rates, etc. that observed along a pipeline.

Therefore, a need exists for an improved air release valve.

SUMMARY OF THE INVENTION

The present disclosure is directed to air release valves that use buoyancy to lift seals into place, allowing accumulated air to be released while also preventing media from escaping from the valve. A combination air valve can vent small volumes of air during normal operation (air release valve) and allow large volumes of air to exit or enter the system as it is filled or drained (air/vacuum valve). Alternatively, this combination air valve can be configured to be only an air release valve.

In certain embodiments the air release valve includes a piston assembly having a main disc, a piston head located above the main disc, a float below the main disc, and a float shaft joining the float to the piston. When no media is in the valve, the float is at the bottom of the valve and the main disc is in a down position. Having the main disc in the down position allows for gases to readily leave the valve through a top opening. As media enters the valve the float is lifted and the main disc is lifted into place to form a seal. Thus, the valve uses buoyancy to lift the main disc into place, preventing media from escaping from the valve. Once the main disc seal is in place, pipeline pressure is used to open and close the valve by means of additional seals that are activated by changes in air volume and media levels within the valve housing.

The invention is directed, in part, to a venting valve for releasing gases entrapped within the valve, the venting valve comprising a housing having a lower opening for the entry of media and gases, and an upper opening for exist of gases. A float is located within the housing. The float is in mechanical communication with a first sealing member, and a second sealing member. The first sealing member is configured to seal a larger opening than the first sealing member (as used herein, the first sealing member is typically a "main disc", while the second sealing member is a "bottom seal". Upon filling the housing with a gas or gas and media mixture, at least a portion of the gases within the valve housing can vent past the open first sealing member and out the upper opening of the valve. This venting can continue until media enters the bottom of the valve sufficient to result in the float becoming sufficiently buoyant to cause the first and second sealing members to seal. The sealing of the first and second sealing members (and in particular the first sealing member) substantially or completely stos further venting of gases. When additional gases accumulate within the housing (such as from bubbles being released from media in a pipeline), float descends as media is replaced by gases. The second sealing member opens in response to the descent of the float, while the first sealing member remains closed (except when so much gases accumulate that the float descends to an even lower position such that the first sealing member (such as the main disc) is opened.

In certain embodiments the float is connected to a shaft, the shaft penetrating through the first sealing member and second sealing member. Typically the first sealing member and second sealing member are aligned upon a common axis.

The venting valve can also further include a piston. The piston is configured to build air pressure upon accumulation of gases within the housing when the first and second sealing members are closed. Upon the building of adequate pressure within the piston the second sealing member (such as the bottom seal) is opened to allow further release of gases from the valve. In some implementations the venting valve further comprises a low-flow vent, the low flow vent in communication with the piston.

In certain embodiments the second seal (such as a bottom seal) is surrounded by a protective flange configured to reduce the exposure of the seal to media. The valve housing also optionally contains a downward flange located near the top of the float. This downward flange reduces the amount of media that can extend into the upper portions of the valve, which helps prevent fouling of the components. In some implementations the downward flange has an inner diameter substantially equal to the outer diameter of the float. In certain embodiments the downward flange has an inner diameter that is within 110 percent of the outer diameter of the float. Typically the downward flange has an inner diameter that is within 120 percent of the outer diameter of the float, alternatively within 150 percent of the outer diameter of the float.

Generally the first sealing member (for example, a main disc) is configured to seal an opening larger than the opening sealed by the second sealing member (for example, the bottom seal). Also, typically the second sealing member is configured to fit over an opening or orifice within the first sealing member (or main disc). Thus the first sealing member is often a rigid disc, with a seal around its edges, and the second sealing member is a smaller seal that opens and closes around an opening with the first sealing member.

Generally first sealing member is configured to seal an opening at least 50 percent larger than the opening sealed by the second sealing member. Alternatively, the first sealing member is configured to seal an opening at least 100 percent larger than the opening sealed by the second sealing member; alternatively the first sealing member is configured to seal an opening at least 200 percent larger than the opening sealed by the second sealing member; and alternatively the first sealing member is configured to seal an opening at least 500 percent larger than the opening sealed by the second sealing member.

In certain embodiments the venting valve has a float shaft with a variable diameter, and the variations in diameter can be used to close and open seals around the float shaft, in particular around the upper end of the float shaft. In some embodiments the float shaft has at least two sealing surfaces. The float shaft can have variable diameters configured to provide seals along the shaft.

The float itself can also have a downward projecting flange around its lower perimeter, and this flange helps direct media (typically a liquid, or a liquid with solids entrapped in it) back away from the side of the float. The float can also have a convex lower surface that directs media sideways, thereby buffering the up and down motion of the float.

The above summary of the present invention is not intended to describe each discussed embodiment of the present invention. This is the purpose of the figures and the detailed description that follow.

FIGURES

The invention may be more completely understood in consideration of the following detailed description of various embodiments of the invention in connection with the accompanying drawings in which.

FIG. 9A shows a first float design.
FIG. 9B shows a second float design.
FIG. 9C shows a third float design.

Figure 10:
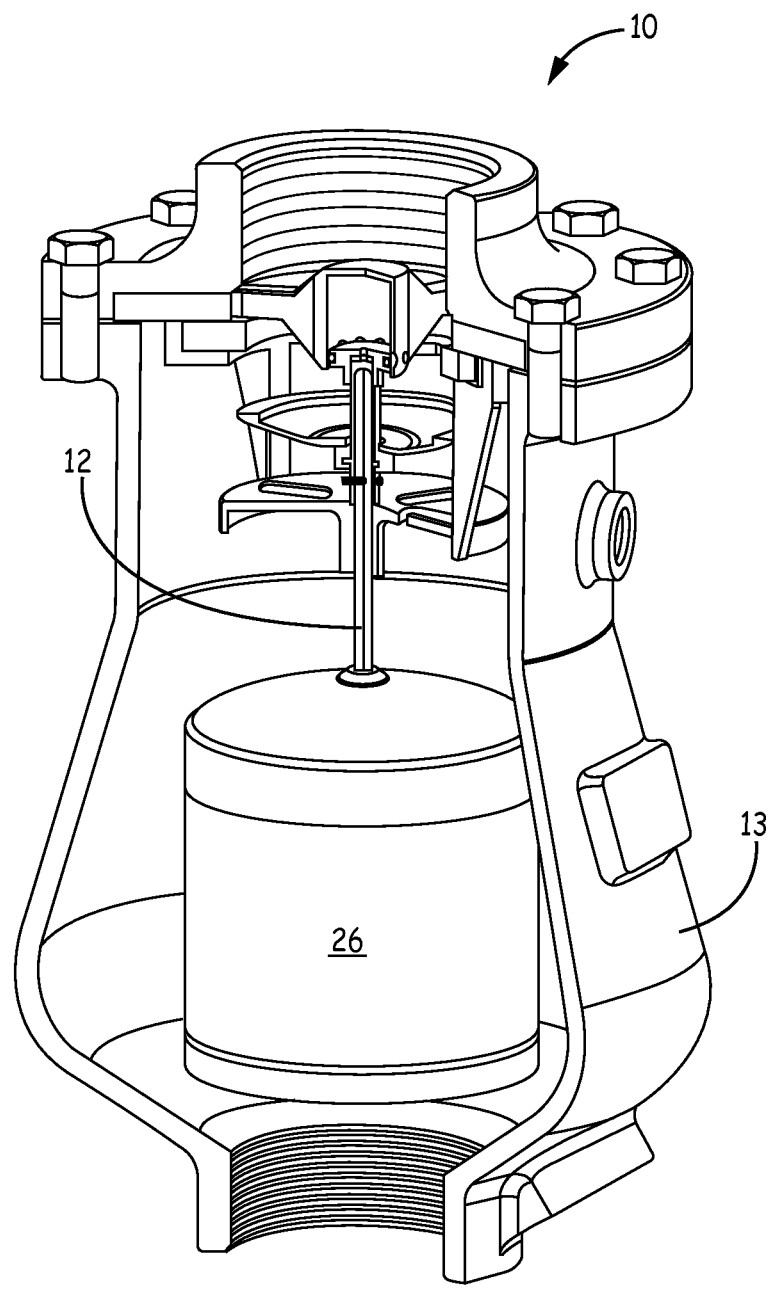

FIG. 10 shows a cross section of a venting valve made in accordance with second implementation of the invention, the valve shown in an open position with no media or gas in the vessel.

Figure 11:
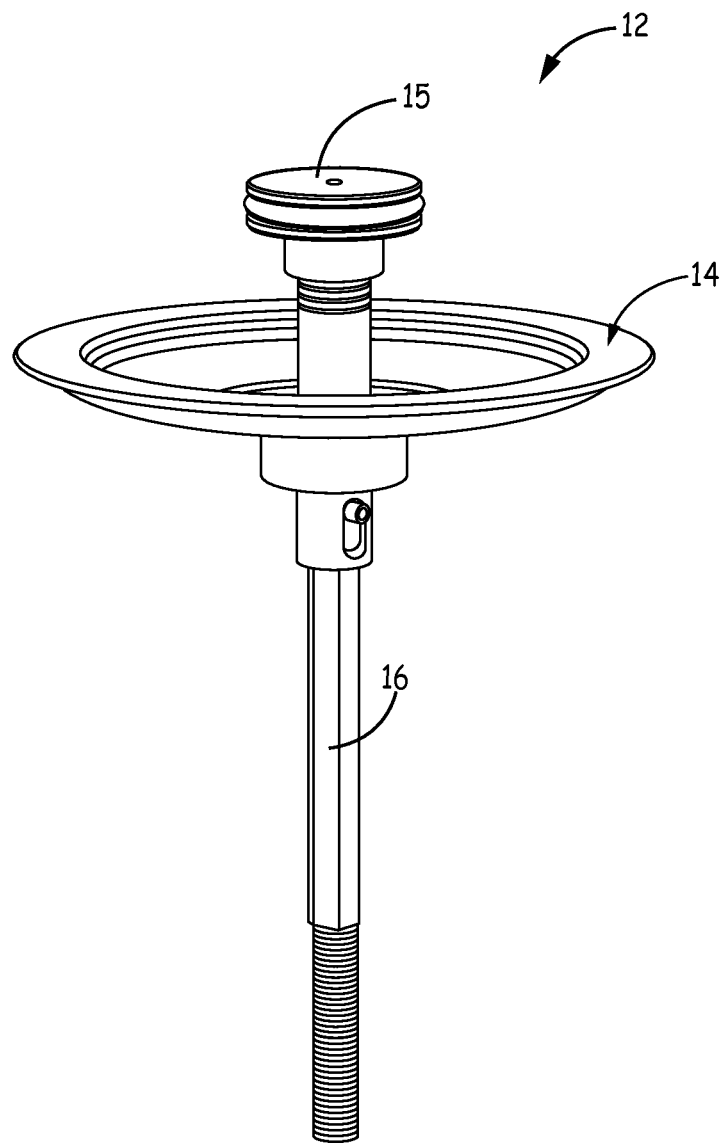

FIG. 11 shows a perspective view of a piston assembly made in accordance with an implementation of the invention, the piston assembly removed from a valve.

Figure 12:
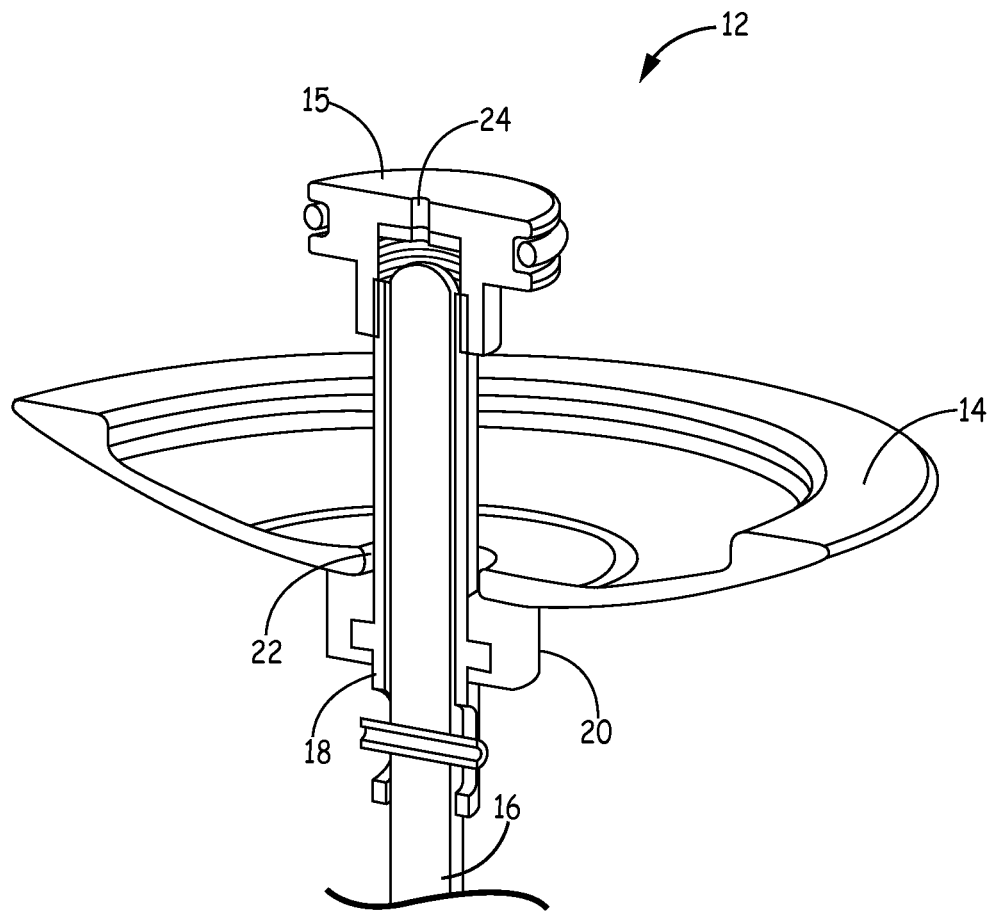

FIG. 12 shows a cross sectional partial view of the piston assembly of FIG. 11.

Figure 13:
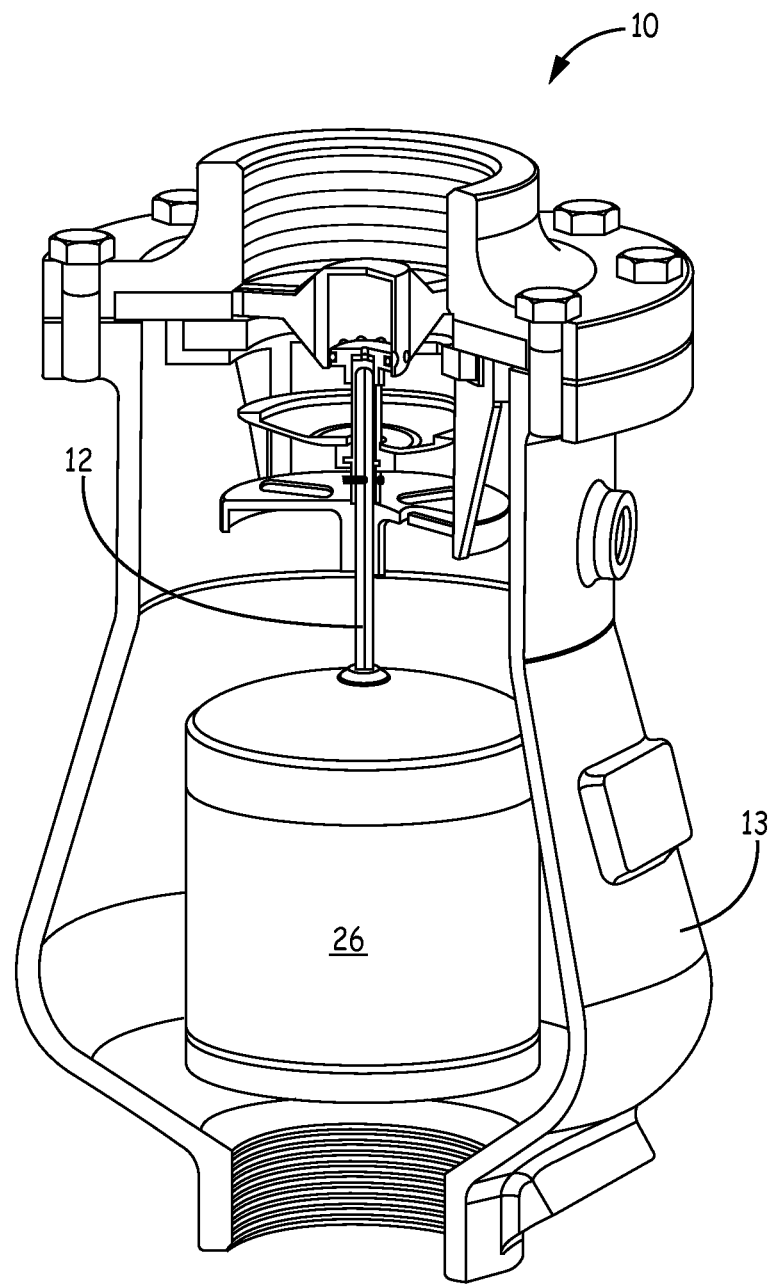

FIG. 13 shows a cross section of a venting valve made in accordance with an implementation of the invention, the valve shown in an open position with no media or gas in the vessel.

Figure 14:
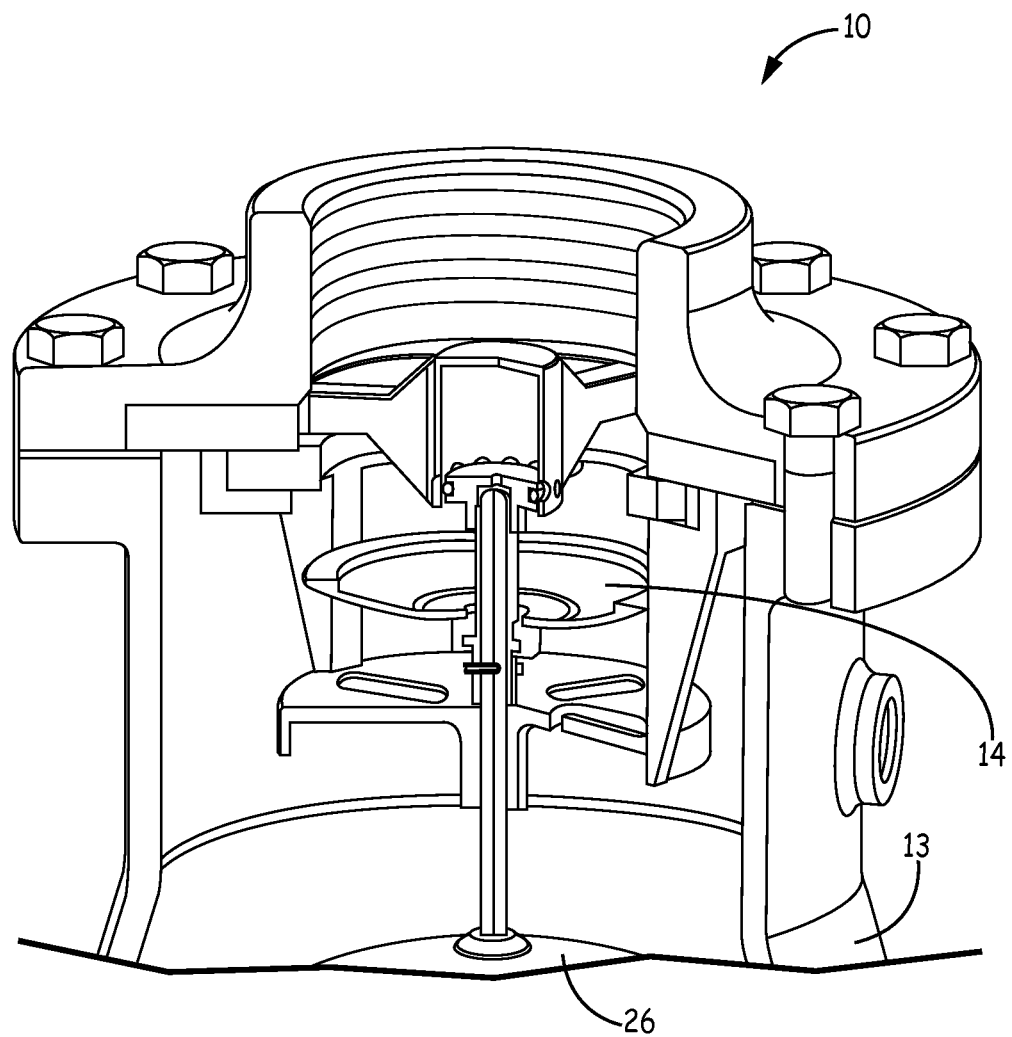

FIG. 14 shows a close-up cross sectional view of the venting valve of FIG. 13, the valve shown in an open position with no media or gas in the vessel.

Figure 15:
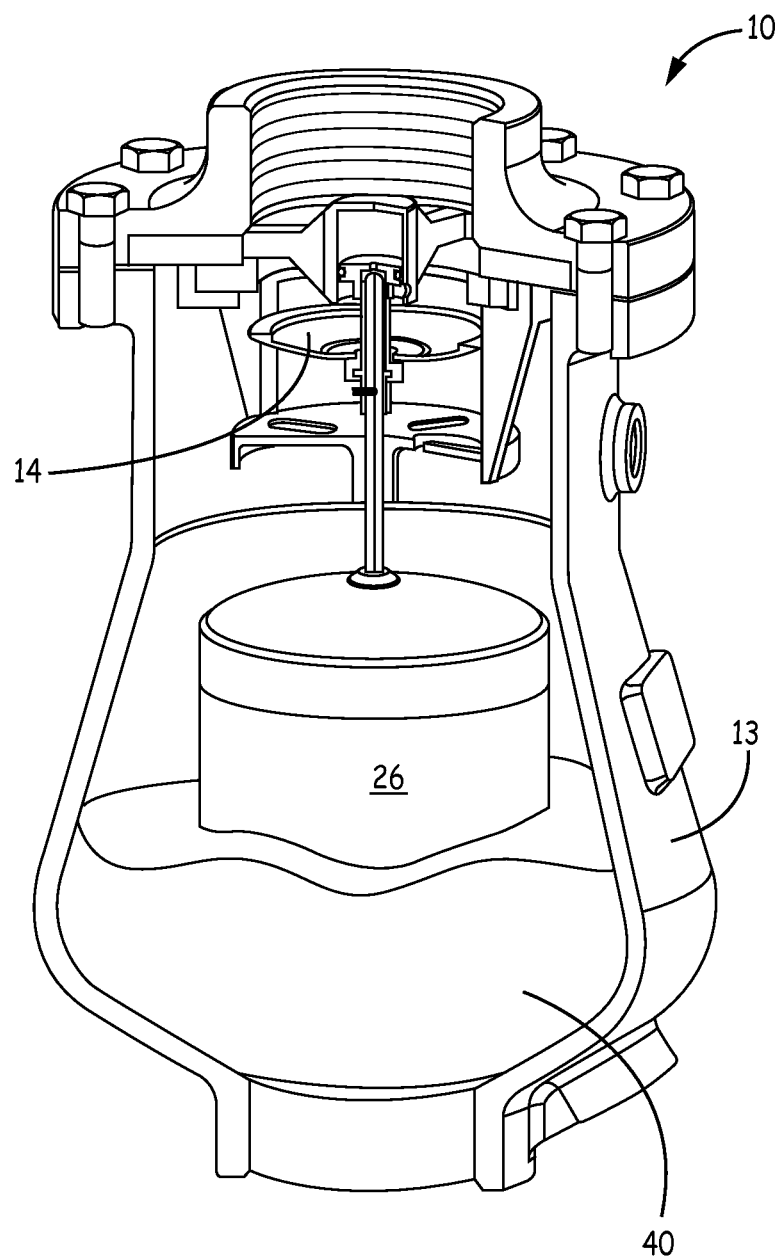

FIG. 15 shows a cross section of a venting valve made in accordance with an implementation of the invention, the valve shown with media having begun to enter through the bottom of the valve.

Figure 16:
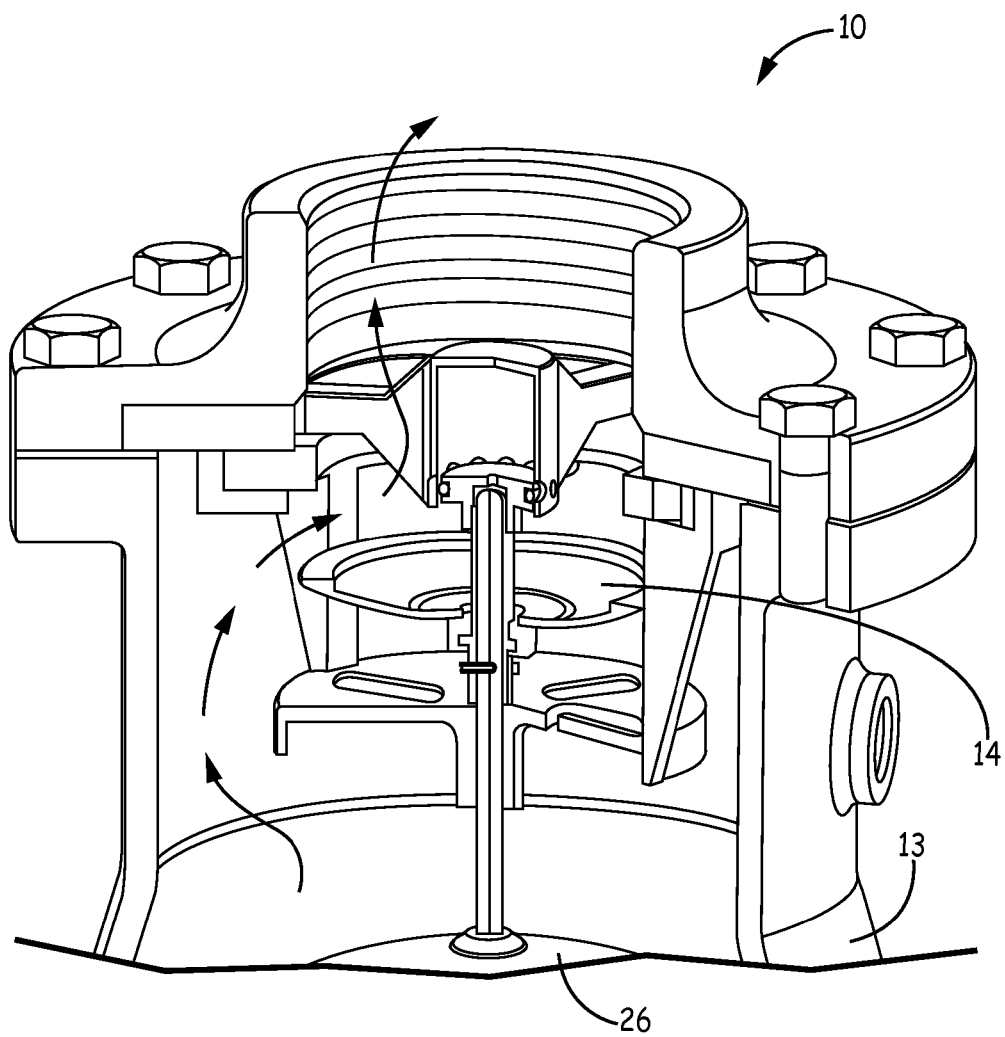

FIG. 16 shows a close up of a cross section of the venting valve of FIG. 15, the valve shown with media having started to enter through the bottom of the valve.

Figure 17:
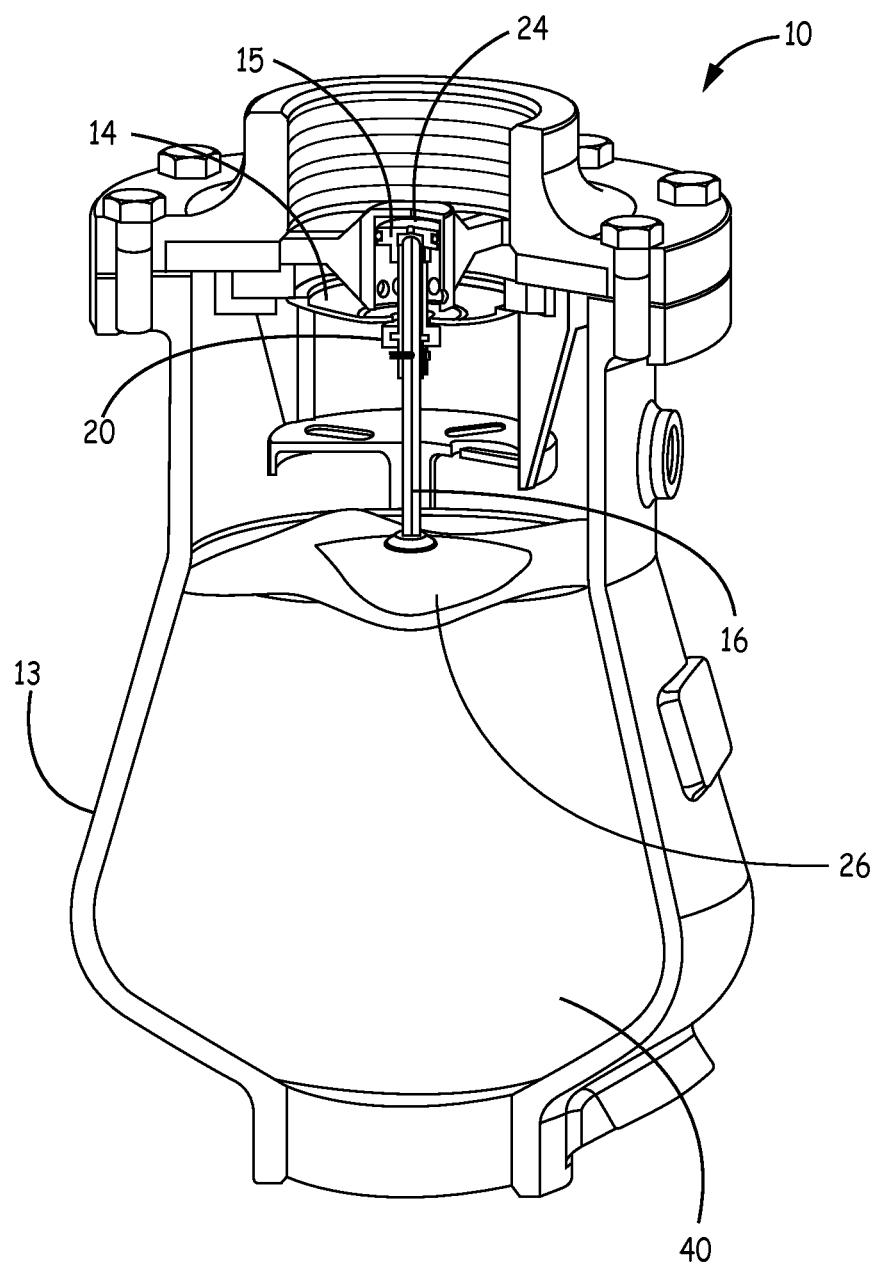

FIG. 17 shows a cross section of a venting valve made in accordance with an implementation of the invention, the valve shown with media having lifted the float within the valve.

Figure 18:
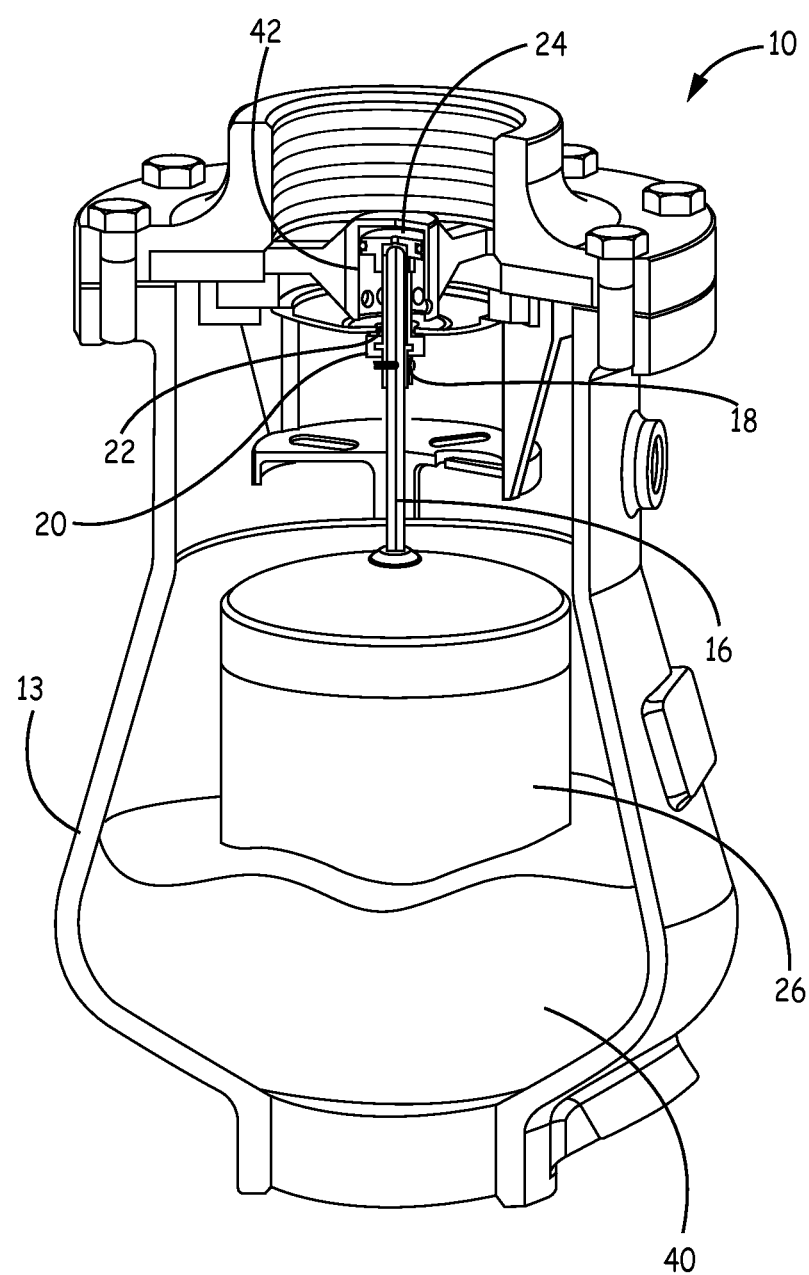

FIG. 18 shows a cross section of a venting valve made in accordance with an implementation of the invention, the valve shown with media having lifted the float within the valve, with the float starting to descend slightly to allow the low flow vent to release gases.

Figure 19:
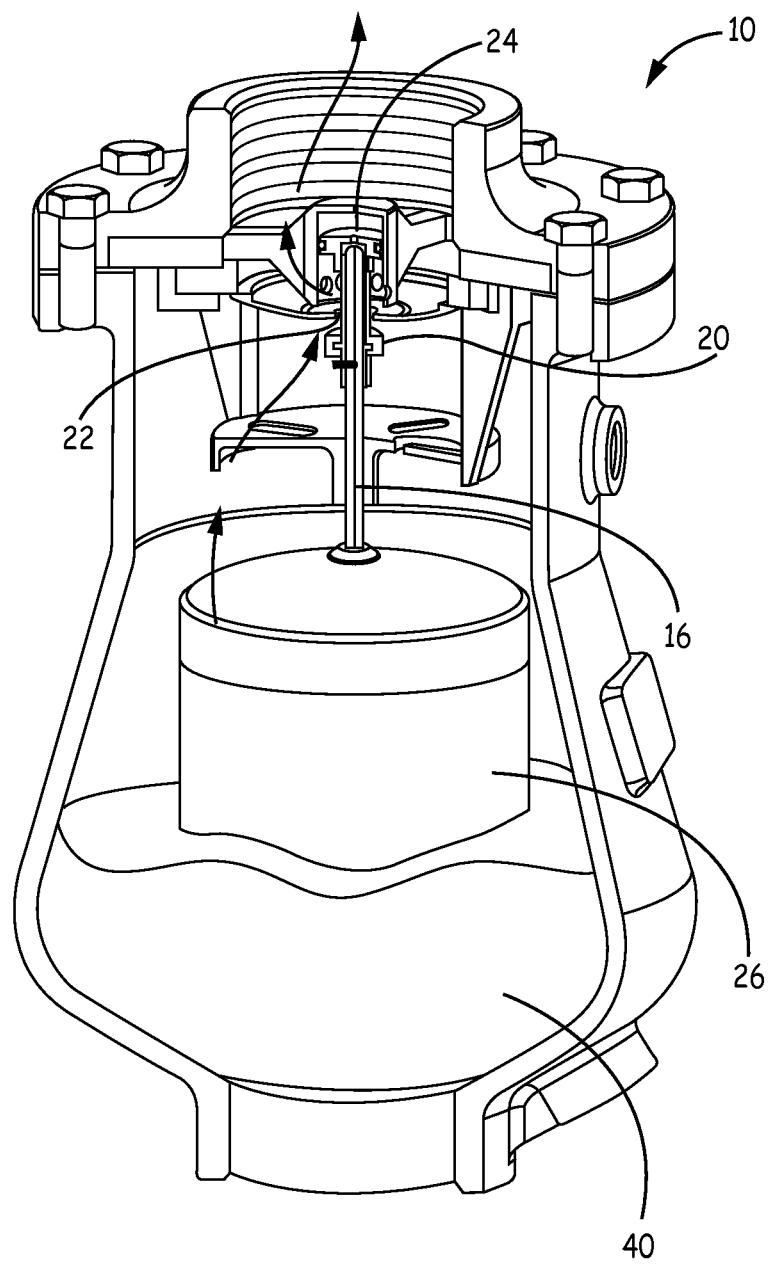

FIG. 19 shows a cross section of a venting valve made in accordance with an implementation of the invention, the valve shown with accumulating gases escaping past the bottom seal.

Figure 20:
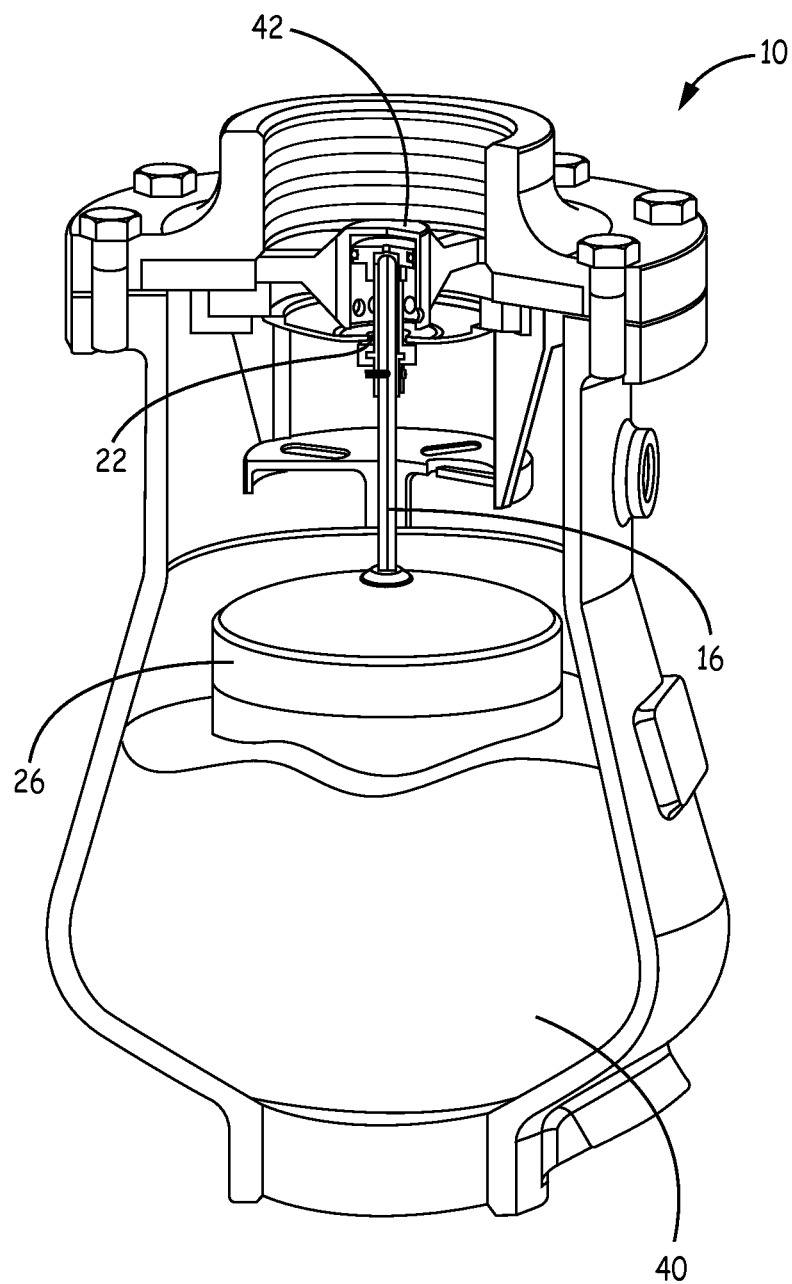

FIG. 20 shows a cross section of a venting valve made in accordance with an implementation of the invention, with the piston pressure orifice closing.

The invention will now be understood by review of the following detailed description.

DETAILED DESCRIPTION

In certain embodiments the air release valve includes a piston assembly having a main disc, a piston head located above the main disc, a float below the main disc, and a float shaft joining the float to the piston. When no media is in the valve, the float is at the bottom of the valve and the main disc is in a down position. Having the main disc in the down position allows for gases to readily leave the valve through a top opening. As media enters the valve the float is lifted and the main disc is lifted into place to form a seal. Thus, the valve uses buoyancy to lift the main disc into place, preventing media from escaping from the valve. Once the main disc seal is in place, pipeline pressure is used to open and close the valve by means of additional seals that are activated by changes in air volume and media levels within the valve housing.

The invention is directed, in part, to a venting valve for releasing gases entrapped within the valve, the venting valve comprising a housing having a lower opening for the entry of media and gases, and an upper opening for exist of gases. A float is located within the housing. The float is in mechanical communication with a first sealing member, and a second sealing member. The first sealing member is configured to seal a larger opening than the first sealing member (as used herein, the first sealing member is typically a "main disc", while the second sealing member is a "bottom seal". Upon filling the housing with a gas or gas and media mixture, at least a portion of the gases within the valve housing can vent past the open first sealing member and out the upper opening of the valve. This venting can continue until media enters the bottom of the valve sufficient to result in the float becoming sufficiently buoyant to cause the first and second sealing members to seal. The sealing of the first and second sealing members (and in particular the first sealing member) substantially or completely stops further venting of gases. When additional gases accumulate within the housing (such as from bubbles being released from media in a pipeline), float descends as media is replaced by gases. The second sealing member opens in response to the descent of the float, while the first sealing member remains closed (except when so much gases accumulate that the float descends to an even lower position such that the first sealing member (such as the main disc) is opened.

In certain embodiments the float is connected to a shaft, the shaft penetrating through the first sealing member and second sealing member. Typically the first sealing member and second sealing member are aligned upon a common axis.

The venting valve can also further include a piston. The piston is configured to build air pressure upon accumulation of gases within the housing when the first and second sealing members are closed. Upon the building of adequate pressure within the piston the second sealing member (such as the bottom seal) is opened to allow further release of gases from the valve. In some implementations the venting valve further comprises a low-flow vent, the low flow vent in communication with the piston.

In certain embodiments the second seal (such as a bottom seal) is surrounded by a protective flange configured to reduce the exposure of the seal to media. The valve housing also optionally contains a downward flange located near the top of the float. This downward flange reduces the amount of media that can extend into the upper portions of the valve, which helps prevent fouling of the components. In some implementations the downward flange has an inner diameter substantially equal to the outer diameter of the float. In certain embodiments the downward flange has an inner diameter that is within 110 percent of the outer diameter of the float. Typically the downward flange has an inner diameter that is within 120 percent of the outer diameter of the float, alternatively within 150 percent of the outer diameter of the float.

Generally the first sealing member (for example, a main disc) is configured to seal an opening larger than the opening sealed by the second sealing member (for example, the bottom seal). Also, typically the second sealing member is configured to fit over an opening or orifice within the first sealing member (or main disc). Thus the first sealing member is often a rigid disc, with a seal around its edges, and the second sealing member is a smaller seal that opens and closes around an opening with the first sealing member.

Generally first sealing member is configured to seal an opening at least 50 percent larger than the opening sealed by the second sealing member. Alternatively, the first sealing member is configured to seal an opening at least 100 percent larger than the opening sealed by the second sealing member; alternatively the first sealing member is configured to seal an opening at least 200 percent larger than the opening sealed by the second sealing member; and alternatively the first sealing member is configured to seal an opening at least 500 percent larger than the opening sealed by the second sealing member.

In certain embodiments the venting valve has a float shaft with a variable diameter, and the variations in diameter can be used to close and open seals around the float shaft, in particular around the upper end of the float shaft. In some embodiments the float shaft has at least two sealing surfaces. The float shaft can have variable diameters configured to provide seals along the shaft.

The float itself can also have a downward projecting flange around its lower perimeter, and this flange helps direct media (typically a liquid, or a liquid with solids entrapped in it) back away from the side of the float. The float can also have a convex lower surface that directs media sideways, thereby buffering the up and down motion of the float.

Figure 1:
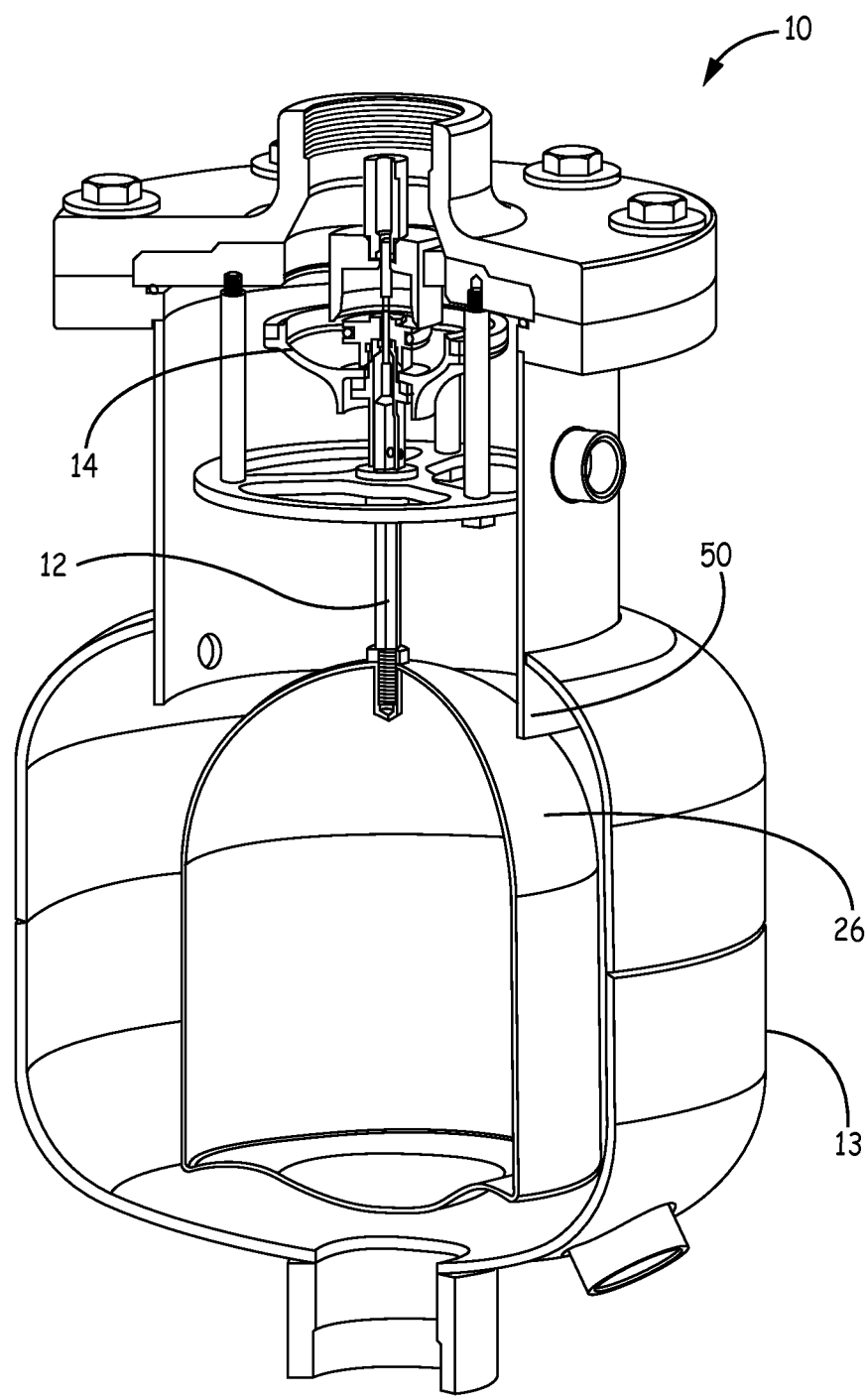
FIG. 1 shows a cross section of a venting valve made in accordance with first implementation of the invention, the valve shown in an open position with no media or gas in the vessel.

Now, in reference to the drawings, FIG. 1 shows a cross section of a venting valve 10 made in accordance with a first implementation of the invention. The valve 10 is shown in an open position with no media or gas in the valve. The main disc 14 is down, opening the valve 10 to the atmosphere. The valve 10 includes a piston assembly 12, at the bottom of which is located a float 26. The piston assembly 12 and float 26 are contained within valve housing 13. Inside the valve is a flange 50 projecting down into the lower portion of the housing, the flange providing protection from media splashing up into the top of the valve 10. Media can still flow around the flange, but splashing is reduced. This downward flange reduces the amount of media that can extend into the upper portions of the valve, which helps prevent fouling of the components. In some implementations the downward flange has an inner diameter substantially equal to the outer diameter of the float. In certain embodiments the downward flange has an inner diameter that is within 110 percent of the outer diameter of the float. Typically the downward flange has an inner diameter that is within 120 percent of the outer diameter of the float, alternatively within 150 percent of the outer diameter of the float.

Figure 2:
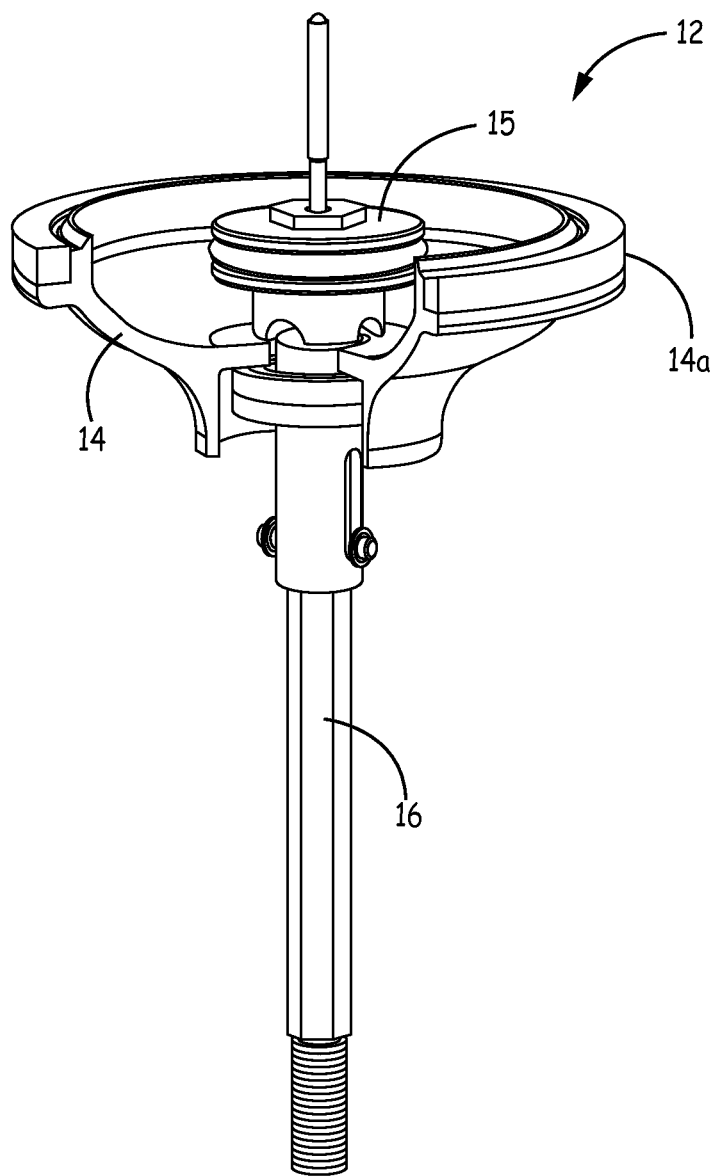
FIG. 2 shows a perspective view of a piston assembly made in accordance with an implementation of the invention, the piston assembly removed from a valve.

The piston assembly 12 is shown in greater detail in FIG. 2, which shows a perspective view of the piston assembly 12 made in accordance with an implementation of the invention. The piston assembly 12 of FIG. 2 is removed from the valve housing. The piston assembly 12 includes a main disc 14 with a perimeter seal 14a, a piston head 15 (with a perimeter o-ring seal in the depicted embodiment), and a float shaft 16. The float shaft 16 can be constructed with flat sides, such as having a hexagonal or octagonal cross section. The bottom of the float shaft 16 can include threads for securing a float. The upper part of the float shaft 16 can include a variable diameter shaft, such as shown in FIG. 3.

Figure 3:
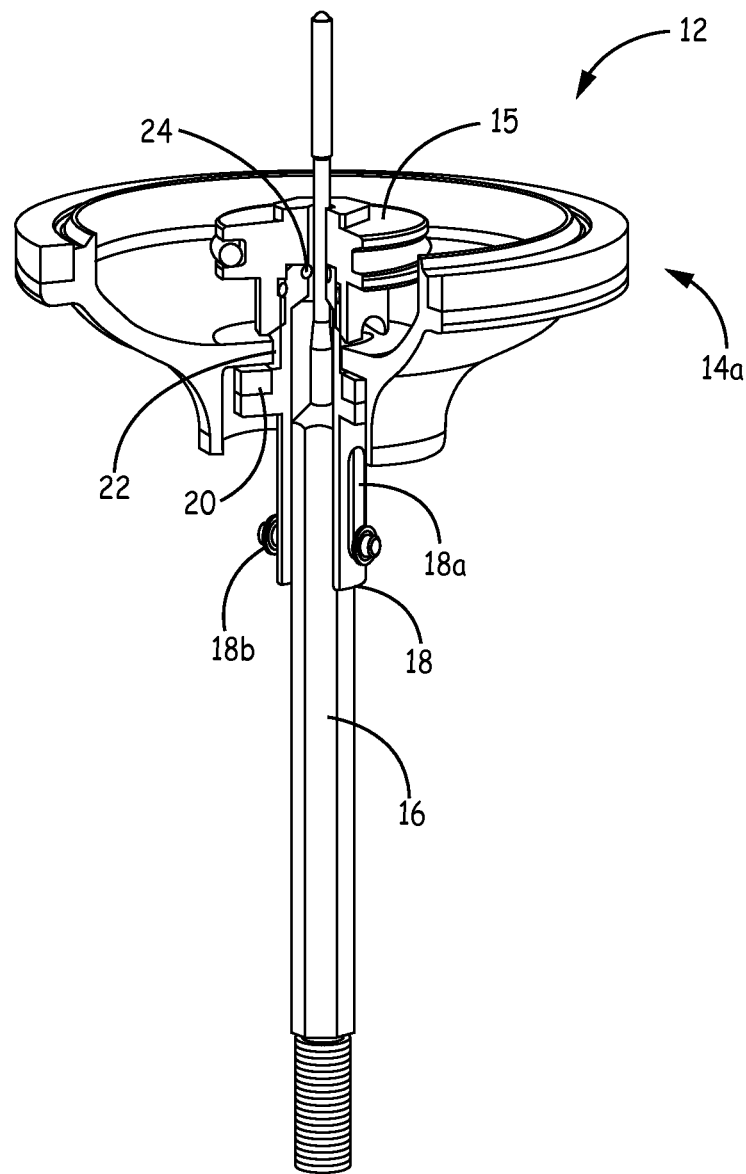
FIG. 3 shows a cross sectional partial view of the piston assembly of FIG. 2.

FIG. 3 shows a cross sectional partial view of the piston assembly 12 of FIG. 2, showing the piston assembly 12 with a main disc 14, a piston head 15, float shaft 16, a piston assembly tube 18, a bottom seal 20, a bottom seal orifice 22, and a piston pressure orifice 24. The float shaft 16 is able to travel a limited distance up and down along the main disc 14, controlled by a slot 18a and pin 18b. As will be described more fully below, the movement of the valve piston assembly 12 components with respect to one another permits for flow and release of entrapped gases. The movement of the valve piston assembly 12 (including the main disc) also permits selective release of entrapped gases (as described further below).

Figure 4:
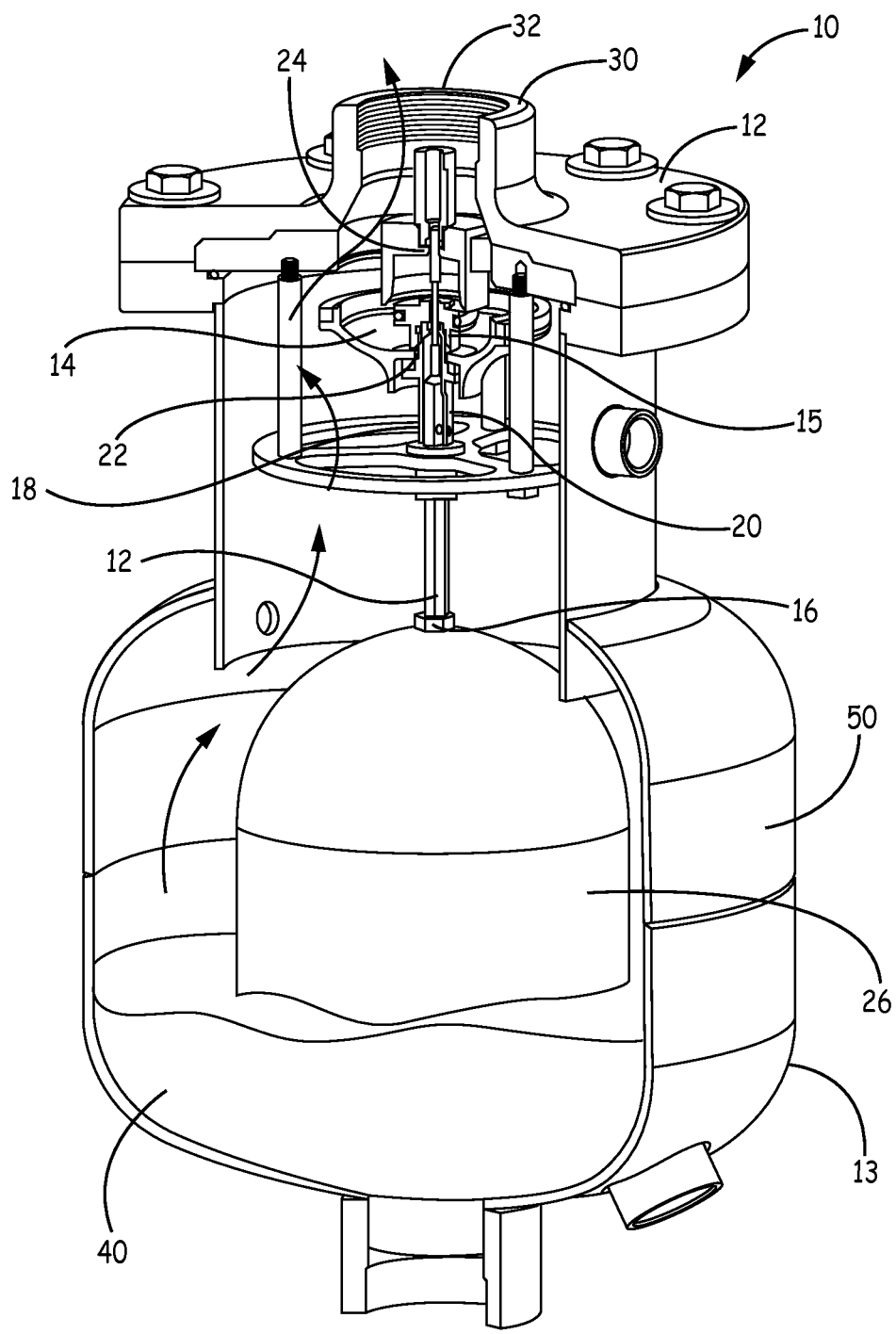
FIG. 4 shows a cross section of a venting valve made in accordance with an implementation of the invention, the valve shown with media having begun to enter through the bottom of the valve.

FIG. 4 shows a cross section of the venting valve 10, showing the piston assembly 12 within the valve 10. The valve 10 is shown with media 40 having started to enter through the bottom of the valve 10, such as when a pipeline is being filled. The float 26 is still positioned at the bottom of the housing 13, but becomes more and more buoyant as the media 40 enters the housing 13. Gases are able to escape out through the top of the valve 10 by passing around the main disc 14 and out of the valve, as shown by the arrows.

Eventually the media becomes high enough, and the float 26 buoyant enough, to lift the main disc 14. Generally the main disc is lifted by pressure applied by a bottom seal 20 located on the underside of the main disc 14. See FIG. 5. The result is that gases no longer can escape past the perimeter of the main disc 14. Note as well that upon sealing of the main disc 14, the bottom seal 20 is also sealed (at least temporarily).

After the main disc 14 is closed, smaller volumes of gases can be released from the valve 10 by interaction of other components, in including the piston head 15 and the bottom seal 20. This occurs, in the example embodiment, by the release of gases into the interior of the piston cylinder, which results in forcing down of the piston and forcing down of the bottom seal 20. The bottom seal 20 can be, for example, formed by a pair of concentric o-rings. This release occurs because a piston pressure orifice 24 near the top of the float shaft 16 closes as soon as the float 26 becomes buoyant. With the piston pressure orifice 24 closed, the piston and main disc 14 rise together as the media enters the housing 13. As noted above, the media entering the valve 10 also contains a gas, in addition to liquid (especially as the pipeline or vessel is filling). The gas flows through the open area around main disc 14, and out the top of the valve 10 to the atmosphere.

As media continues to enter the valve housing 13, the media level rises and gases escape from the top of the valve 10. The float 26 also gradually rises. As the media level rises further the main disc 14 rises together. Eventually the media lifts the float 26 and it pushes main disc 14 into a closed position, resulting in trapping gases within the valve 10. If gases continue to accumulate, or media enters the valve, it creates an elevated pressure of gas within the top portion of the valve housing 13. The elevated pressure holds the main disc 14 and the bottom seal 20 in place during operation. Further gas is not able to escape because the main disc 14 and bottom seal 20 prevent gases from escaping.

Figure 5:
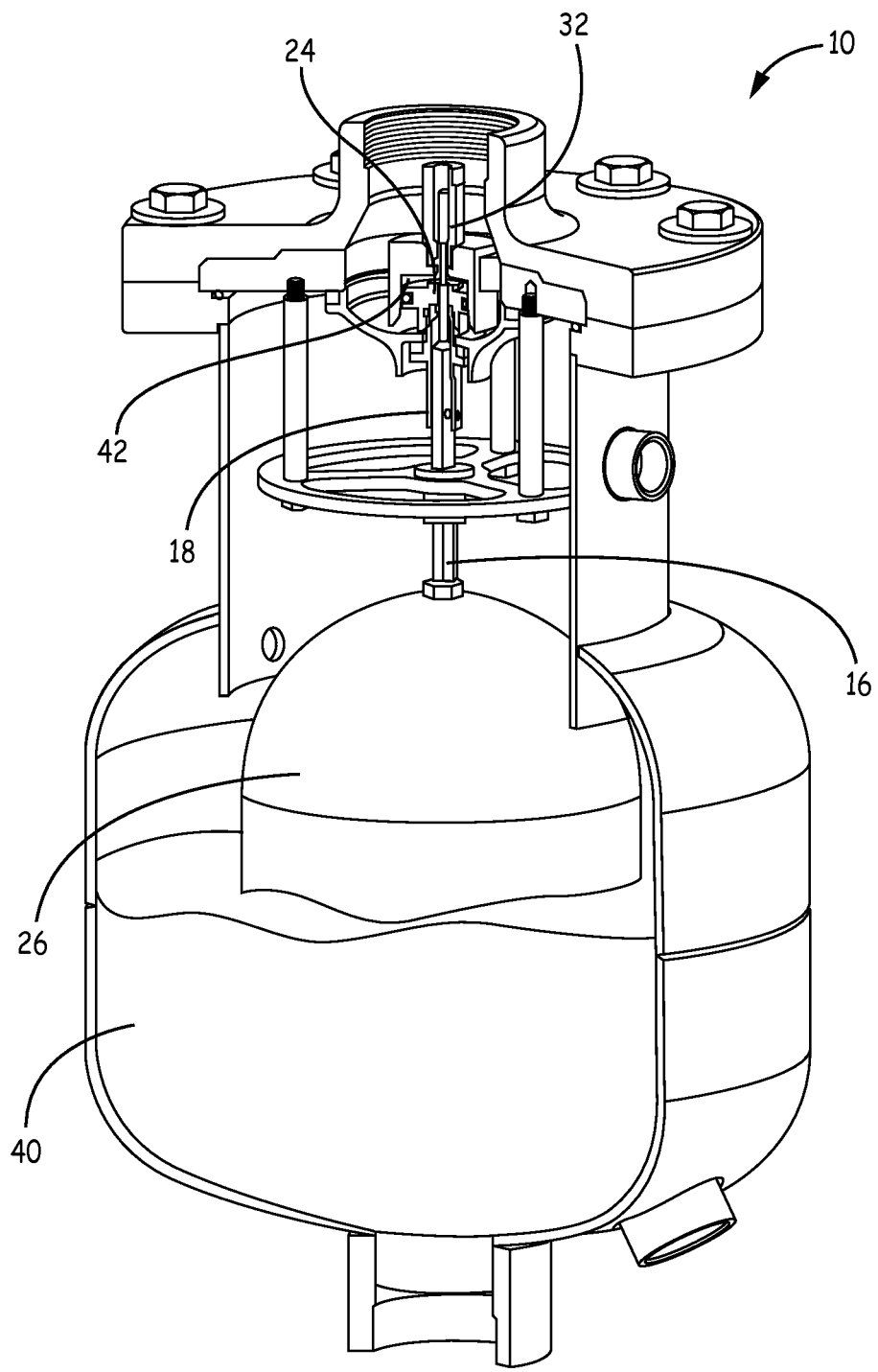
FIG. 5 shows a cross section of a venting valve made in accordance with an implementation of the invention, the valve shown with media having lifted the float within the valve, with the float starting to descend slightly to allow low flow vent to release gases.
Figure 6:
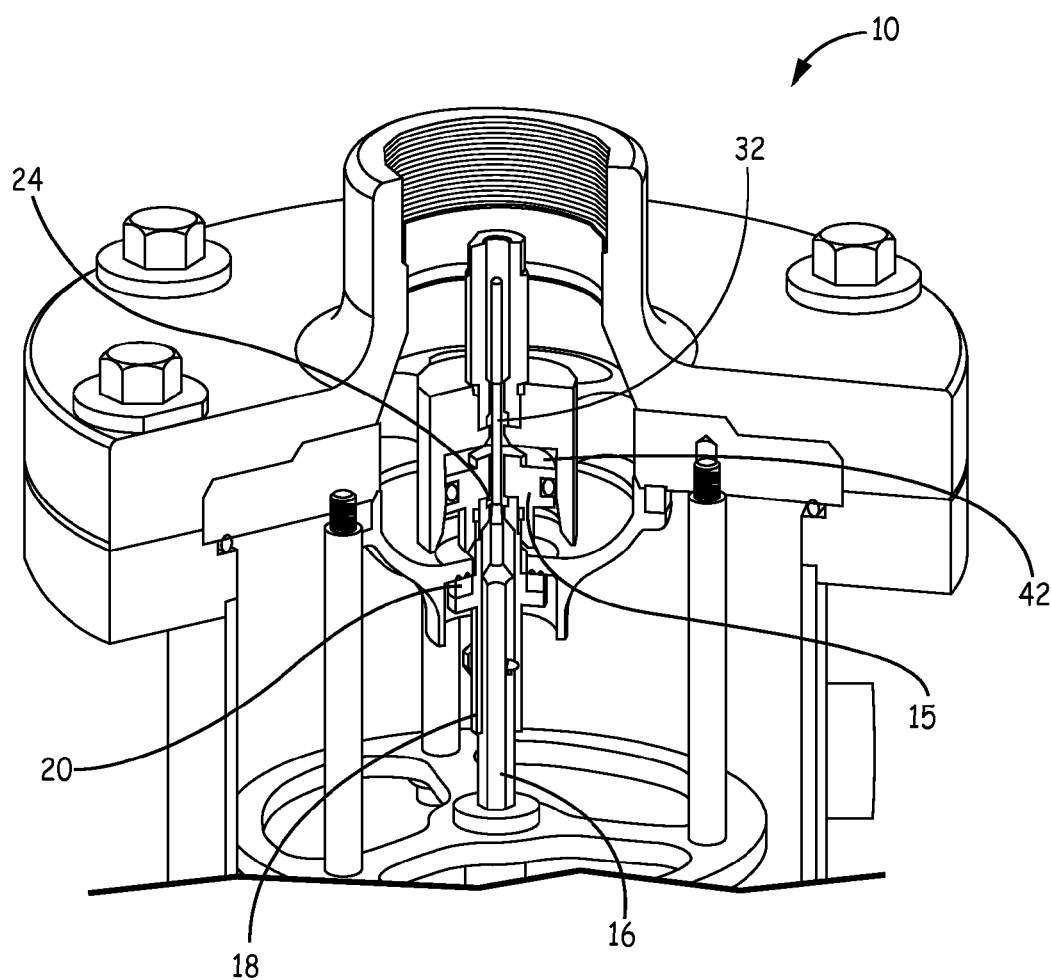
FIG. 6 shows a close up of FIG. 5.

As new gases accumulate, if they do accumulate, the level of media 40 drops within the housing 13 because the gases displace the media 40, and pressure also typically increases within the housing 13. The float and float shaft follow the media level down as it is displaced by gas/air. This movement down of the float and float shaft 16 can result in opening of the piston pressure orifice 24 (see FIG. 3 as well). Once the piston pressure orifice 24 is open, gases flow in a gap between the float shaft 16 and the piston assembly tube 18. The gases then pass through the low flow vent 32 and finally to the atmosphere. If the rate of gases entering the vent valve 10 surpasses the rate of gases leaving the low flow vent 32, the float 26 will drop to a lower position. The lower position will close the low flow vent 32, trapping the gas in the piston cylinder 42. As the gas continues to flow into the piston cylinder 42, it can overcome the force on the bottom seal 20 (also see FIG. 3) opening the bottom seal orifice 22 (also see FIG. 3) allowing gas to vent to atmosphere FIG. 5 shows a cross section of a venting valve 10 with media 40 having lifted the float 26 within the valve, but with accumulating air in the housing displacing the media 40. FIG. 6 shows a close up of a portion of FIG. 5. The float and float shaft follow the media level down as it is displaced by gas/air. This movement down of the float and float shaft 16 can open the piston pressure orifice 24. Once the piston pressure orifice 24 is open, gases flow between the float shaft 16 and the piston assembly tube 18, pass through the pressure chamber 30 and through the low flow vent 32 and finally to the atmosphere. If the rate of gases entering the vent valve 10 surpasses the rate of gases leaving the low flow vent 32, the float 26 will drop to a lower position. The lower position will close the low flow vent 32 trapping the gas and resulting pressure, in the piston cylinder 42. As the pressure increases in the piston cylinder 42, it can overcome the force on the bottom seal 20 (also see FIG. 3) opening the bottom seal orifice 22 (also see FIG. 3) allowing gas to vent to atmosphere, as shown in FIG. 7.

Figure 7:
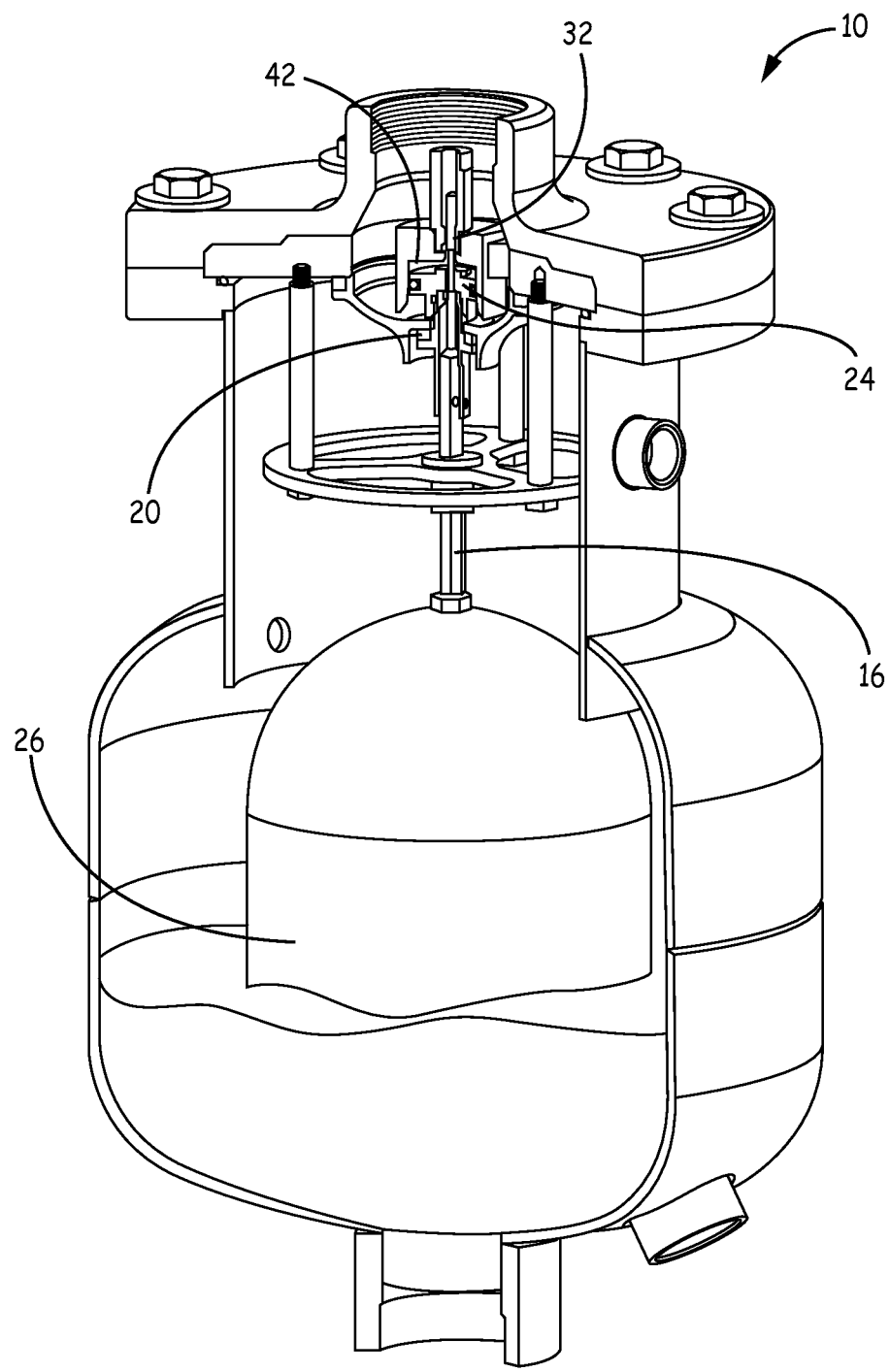
FIG. 7 shows a cross section of a venting valve made in accordance with an implementation of the invention, the valve shown with accumulating gases escaping past the bottom seal.
Figure 8:
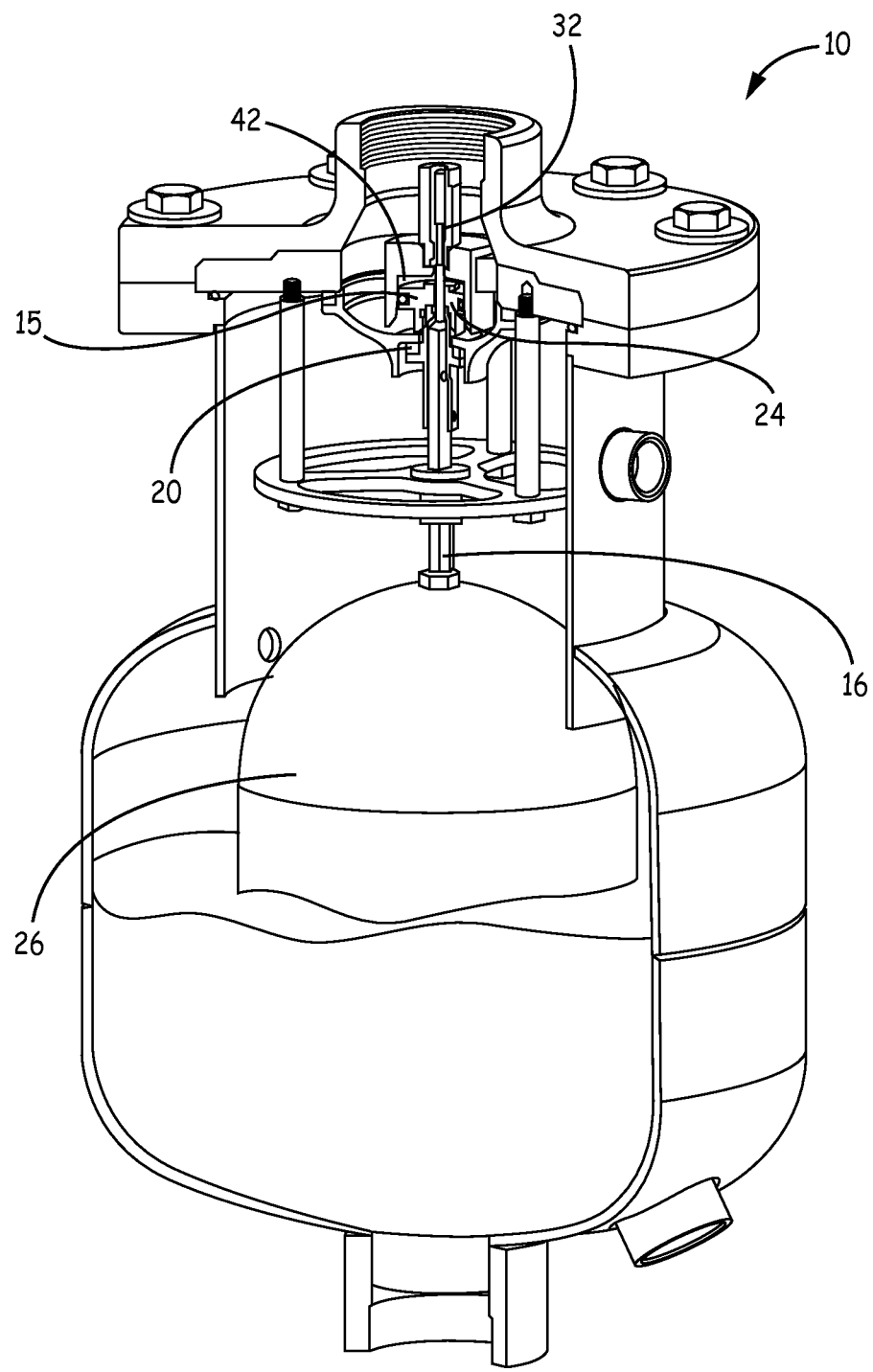
FIG. 8 shows a cross section of a venting valve made in accordance with an implementation of the invention, with the piston pressure orifice closing.

FIG. 7 shows a cross section of a venting valve 10, the venting valve 10 shown with accumulating gases escaping past the bottom seal 20. Typically the bottom seal 20 will move from 0.010 to 0.100 inches from a closed to open position, more typically from 0.025 to 0.050 inches; and often from 0.030 to 0.040 inches. The distance moved by the bottom seal 20 is controlled by the piston. Greater distances will result in more rapid release of air within the lower portion of the valve, but also result in more rapid and violent entry of media into the lower portion of the valve. Therefore, depending upon the various valve dimensions and the media that will be handled, the movement of the bottom seal can be modified to provide suitable performance. As the gases vent out of the valve, the media 40 level rises, and the piston pressure orifice 24 is closed. FIG. 8 shows the venting valve 10 with the piston pressure orifice 24 closing. Once closed, the resulting force on the piston head 15 is relatively small and pressure from within the valve reseats the bottom seal 20, starting the cycle over.

Typically the size of the piston head 15 is matched to the size of the bottom seal 20 to control opening force, and the piston head 15 is larger in surface area than the bottom seal surface. In this manner the venting valve 10 can be made to work over a broad pressure range, such as less than 5 psi up to 150 psi and in some embodiments as high as 300 psi or more. Furthermore, as pressure on the piston head 15 pushes down, pressure on bottom seal 20 pushes up. Piston head 15 size is preferably larger than the bottom seal 20, allowing for a net downward force when the piston head orifice is open. In some implementations the area sealed by the bottom seal is 10 percent smaller than the area of the piston head; alternatively the bottom seal is 20 percent smaller in surface area than the piston head; alternatively the bottom seal is 30 percent smaller in surface area than the piston head; alternatively the bottom seal is 40 percent smaller in surface area than the piston head; and alternatively the bottom seal is 50 percent smaller in surface area than the piston head. This allows for a single design to operate over different pressure ranges.

Generally the piston and main disc are engineered to control piston travel moving down. The piston travel distance controls the bottom seal orifice venting rate, along with the diameter of the bottom seal. When the piston head moves down the bottom seal is opened. It is possible to have either larger or smaller piston travel distances to impact timing of opening of the bottom seal.

It will also be understood that he low flow vent (formed, for example, by the variable diameter of the top portion of the float shaft 16 as it engages a perimeter seal around the float shaft) is engineered to bleed trapped air when the float shaft is moving up. It will be further noted that the bottom seal orifice is sized to vent the required amount of gas to control distance of media level rise in the vessel during venting. The main disc and vent mechanism are sized to allow full area opening at top of vessel to match media inlet opening at bottom of vessel. This can be done per an industry standard and can ensure gas is allowed to enter and leave the valve quick enough.

The piston pressure orifice is typically located above the pressure chamber, greatly reducing the risk of plugging. The bottom seal is located on the bottom surface of the main disc 14, which is protected from media by a protection ring on the bottom of the main disc. Another protection feature is the media deflection ring or flange on the inside of the valve body. The deflection ring decreases the potential of media from splashing and reaching the components above the float.

FIGS. 9A-9C show several embodiments of the float 26. The float can be configured such that media entering the valve is deflected away from the float 26. The media diffusion can reduce the media velocity and reduce the risk of media getting above the float. The bottom of the float 28, can be designed to increase float lift while deflecting media. The float mass and volume can be optimized to allow the media level during operation to be as low as possible. The bottom of the float 28 can include a concave portion and a convex portion, such as shown in FIG. 9A. The bottom of the float 28 can include a lip, such as an outside diameter of the float extending towards the bottom of the valve (as shown in FIG. 9B). The float 26 can include a peak in the middle of the bottom of the float 28, such as shown in FIG. 9C. The float 26 can be hollow (as shown in FIGS. 9A and 9B) or solid (as shown in FIG. 9C).

Referring now to FIG. 10, a cross section of a venting valve 10 made in accordance with a second implementation of the invention is shown. The valve 10 is shown in an open position with no media or gas in the valve. The valve 10 includes a piston assembly 12, at the bottom of which is located a float 26. The piston assembly 12 and float 26 are contained within valve housing 13.

The piston assembly 12 is shown in greater detail in FIG. 11, which shows a perspective view of the piston assembly 12 made in accordance with an implementation of the invention. The piston assembly 12 of FIG. 2 is removed from the valve housing. The piston assembly 12 includes a main disc 14, a piston head 15, and float shaft 16. The bottom of the float shaft 16 can include threads for securing a float.

FIG. 12 shows a cross sectional partial view of the piston assembly 12 of FIG. 11, showing the piston assembly 12 with a main disc 14, a piston head 15, float shaft 16, a piston assembly tube 18, a bottom seal 20, a bottom seal orifice 22, and a piston pressure orifice 24. Referring now to FIGS. 13 to 20, aspects of the operation of the valve 10 will be described. FIG. 13 shows a cross section of a venting valve 10 made in accordance with an implementation of the invention, depicting how the piston assembly 12 is located within the valve housing 13. The valve 10 is shown in an open position with no media in the vessel. A float 26 is near the bottom of the valve housing 13.

FIG. 14 shows a close-up cross sectional view of the venting valve 10 of FIG. 13, the valve 10 also shown in an open position with no media in the vessel. The main disc 14 is down, opening the valve to the atmosphere.

FIG. 15 shows a cross section of the venting valve 10 with media 40 having started to enter through the bottom of the valve 10, such as when a pipeline is being filled. The float 26 is still positioned at the bottom of the housing 13, but becomes more and more buoyant as the media 40 enters the housing 13. Eventually the media becomes high enough, and the float buoyant enough, to lift the main disc 14. The piston pressure orifice 24 closes as soon as the float becomes buoyant, resulting in the piston and main disc rising together as the media enters the housing 13.

In reference now to FIG. 16, a close up of a cross section of valve 10 from FIG. 6 is shown. As shown in FIG. 15 and FIG. 16, media enters through the bottom of the valve 10. Often, this media also contains a gas (especially as the pipeline or vessel is filling). The gas flows through the open area around main disc 14, and out the top of the valve 10 to the atmosphere (as shown by red arrows in FIG. 16 depicting an example gas release path).

As media continues to enter the valve housing 13, the media level rises and gases escape from the top of the valve 10. The float also gradually rises. FIG. 17 shows the venting valve 10 with media having lifted the float 26 within the valve housing 13. As the media level rises further it lifts the float 26 and it pushes the piston head 15 and bottom seal 20 into a closed position, resulting in trapping gases within the valve. This creates a high-pressure chamber of gas within the valve housing 13. The high pressure holds the main disc 14 and the bottom seal 20 in place during operation. Further gas is not able to escape because the main disc 14 and bottom seal 20 prevent gases from escaping. As new gases accumulate, if they do accumulate, the level of media 40 drops within the housing 13 because the gases displace the media 40. FIG. 18 shows a cross section of a venting valve with media having lifted the float within the valve, but with accumulating air in the housing displacing the media 40. The float 26 and float shaft 16 follow the media level down as it is displaced by air. This movement down of the float 26 and float shaft 16 opens the piston pressure orifice 24 (see FIG. 12 as well). Once the piston pressure orifice 24 is open, gases flow between the float shaft 16 and the piston assembly tube 18, trapping the gas and resulting pressure, in the piston cylinder 42. As the pressure increases in the piston cylinder 42, it overcomes the force on the bottom seal 20 opening the bottom seal orifice 22 allowing gas to vent to atmosphere, as shown in FIG. 19.

As the gases vent the media level rises, the piston pressure orifice 24 is closed. FIG. 20 shows the venting valve 10 with the piston pressure orifice 24 closing. Once closed, the resulting force on the piston head is relatively small and pressure from within the valve reseats the bottom seal 20, starting the cycle over. Typically piston head size is matched to the size of the bottom seal to control opening force. In this manner the valve can be made to work over a broad pressure range, such as less than 5 psi up to 150 psi and in some embodiments as high as 300 psi or more. Furthermore, as pressure on the piston head pushes down, pressure on bottom seal pushes up. Piston head size is larger than the bottom seal, allowing for a net downward force when the piston head orifice is open. This allows for a single design to operate over different pressure ranges.

Generally the piston head seal and pressure chamber are engineered to control piston travel moving down. The piston travel distance controls the bottom seal orifice venting rate, along with the diameter of the bottom seal. The low flow vent is engineered to bleed trapped air when float shaft is moving up. It will be further noted that the bottom seal orifice is sized to vent the required amount of gas to control distance of media level rise in the vessel during venting. The amount of travel by float is engineered to ensure timing and travel matches piston timing and travel.

The main disc and vent mechanism are sized to allow full area opening at top of vessel to match media inlet opening at bottom of vessel. The piston chamber typically includes vent holes to relieve pressure if the piston travels beyond designed travel distance. Typically the piston pressure orifice is located outside the pressure chamber greatly reducing risk of plugging. If the orifice does plug, the valve fails closed to prevent accidental media discharge. The piston pressure orifice is typically located above the pressure chamber greatly reducing the risk of plugging.

The present invention should not be considered limited to the particular examples described above but rather should be understood to cover all aspects of the invention as fairly set out in the attached claims. Various modifications equivalent processes as well as numerous structures to which the present invention may be applicable will be readily apparent to those of skill in the art to which the present invention is directed upon review of the instant specification.

We claim:

1. A venting valve for releasing gases entrapped within the valve, the venting valve comprising:
    a) a housing having a lower opening for the entry of media and gases, and an upper opening for exit of gases;
    b) a float located within the housing, the float connected to a float shaft, the float shaft in mechanical communication with:
        1) a first sealing member comprising a main disc, and
        2) a second sealing member, the second sealing member configured to form a seal with the underside of an opening in the main disc of the first sealing member;
        3) a piston located within a piston cylinder and above the second sealing member; the piston in mechanical communication with the second sealing member such that the second sealing member moves along with movement of the piston, and the piston having a piston pressure orifice that allows gases to flow into the piston cylinder, the piston pressure orifice located proximal to an upper end of the float shaft;
    wherein the buildup of liquids within the housing causes the float and float shaft to rise, the rising float shaft raises the second sealing member until it makes contact with the main disc of the first sealing member, and upward force from the second sealing member raises the main disc of the first sealing member until the first sealing member and second sealing member close;
    wherein upon subsequent buildup of gases within the housing, some of the gases flow into the piston cylinder through the piston orifice to accumulate in the piston cylinder, accumulation of gases in the piston cylinder causes the piston to move downward, and the movement downward of the piston causes the second sealing member to move downward and to open without opening the first sealing member such that gases can escape past the second sealing member and out of the valve housing while the first sealing member remains sealed; and
    wherein upon release of gases within the housing past the second sealing member the float rises until the second sealing member returns to a closed position in contact with the main disc, with the piston moving upward with the upward movement of the second sealing member.

2. The venting valve for releasing gases according to claim 1, wherein the float shaft penetrates through the first sealing member and second sealing member.

3. The venting valve for releasing gases according to claim 1, wherein the first sealing member and second sealing member are aligned upon a common axis.

4. The venting valve for releasing gases according to claim 1, wherein the piston has a head with a surface area that is at least 10 percent larger than the opening sealed by the second sealing member.

5. The venting valve for releasing gases according to claim 1, wherein the piston has a head with a surface area that is at least 25 percent larger than the opening sealed by the second sealing member.

6. The venting valve for releasing gases according to claim 1, wherein the piston has a head with a surface area that is at least 50 percent larger than the opening sealed by the second sealing member.

7. The venting valve for releasing gases according to claim 1, wherein the piston has a head with a surface area that is at least 100 percent larger than the opening sealed by the second sealing member.

8. The venting valve for releasing gases according to claim 1, further comprising a low-flow vent, the low flow vent in communication with the piston.

9. The venting valve for releasing gases according to claim 1, wherein the second seal is surrounded by a protective flange configured to reduce the exposure of the seal to media.

10. The venting valve for releasing gases according to claim 1, wherein the housing contains a downward flange located near the top of the float.

11. The venting valve for releasing gases according to claim 10, wherein the downward flange has an inner diameter substantially equal to the outer diameter of the float.

12. The venting valve for releasing gases according to claim 1, wherein the downward flange has an inner diameter that is within 110 percent of the outer diameter of the float.

13. The venting valve for releasing gases according to claim 1, wherein the downward flange has an inner diameter that is within 120 percent of the outer diameter of the float.

14. The venting valve for releasing gases according to claim 1, wherein the downward flange has an inner diameter that is within 150 percent of the outer diameter of the float.

15. The venting valve for releasing gases according to claim 1, wherein the first sealing member is configured to seal an opening larger than the opening sealed by the second sealing member.

16. The venting valve for releasing gases according to claim 1, wherein the first sealing member is configured to seal an opening at least 500 percent larger than the opening sealed by the second sealing member.

17. The venting valve for releasing gases according to claim 1, wherein the float shaft has a variable diameter.

18. The venting valve for releasing gases according to claim 1, wherein the float shaft has at least two sealing surfaces.

19. The venting valve for releasing gases according to claim 1, wherein the float shaft has variable diameters configured to provide seals along the shaft.

20. The venting valve for releasing gases according to claim 1, wherein the float has a downward projecting flange around its lower perimeter.

21. The venting valve for releasing gases according to claim 1, wherein the float has a convex lower surface.

* * * * *